US009857572B2

(12) United States Patent
Tseng et al.

(10) Patent No.: US 9,857,572 B2
(45) Date of Patent: Jan. 2, 2018

(54) FIXED-FOCUS PROJECTION LENS

(71) Applicant: CALIN TECHNOLOGY CO., LTD., Taichung (TW)

(72) Inventors: Chien Hsiung Tseng, Hsinchu (TW); Yi-Ling Yang, Taichung (TW); Po-Nien Tsai, Pingtung County (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 15/234,502

(22) Filed: Aug. 11, 2016

(65) Prior Publication Data
US 2017/0351068 A1 Dec. 7, 2017

(30) Foreign Application Priority Data

Jun. 2, 2016 (TW) .............................. 105117396 A

(51) Int. Cl.
*G02B 9/00* (2006.01)
*G02B 13/16* (2006.01)
*G02B 27/00* (2006.01)
*G02B 5/00* (2006.01)
*G02B 9/60* (2006.01)
*G02B 13/00* (2006.01)

(52) U.S. Cl.
CPC ............. *G02B 13/16* (2013.01); *G02B 5/005* (2013.01); *G02B 9/60* (2013.01); *G02B 13/0045* (2013.01); *G02B 27/0025* (2013.01)

(58) Field of Classification Search
CPC ........................................................ G02B 13/16
USPC ..................... 359/649–651, 713, 752, 756
See application file for complete search history.

(56) References Cited

U.S. PATENT DOCUMENTS

2012/0057249 A1* 3/2012 Yamamoto ............ G02B 13/18
359/713

* cited by examiner

*Primary Examiner* — William Choi
(74) *Attorney, Agent, or Firm* — Lynette Wylie; Apex Juris, pllc

(57) ABSTRACT

A fixed-focus projection lens, in order from an image side to an image source side along an optical axis, includes a first lens with negative refractive power, a second lens with positive refractive power, a third lens with negative refractive power, a fourth lens with positive refractive power, a fifth lens with positive refractive power, and a sixth lens with positive refractive power. The second lens is a biconvex lens. While projecting, a light enters the fixed-focus projection lens from the image source side, and passes through the fixed-focus projection lens. Further more, at least one surface of the first lens is aspherical, a refractive index of the second lens is greater than 1.8, and a refractive index of the fifth lens is greater than 1.7. Such arrangement helps to lower a spherical aberration of spherical lens, shortening the optical system, and effectively lower the distortion.

30 Claims, 12 Drawing Sheets

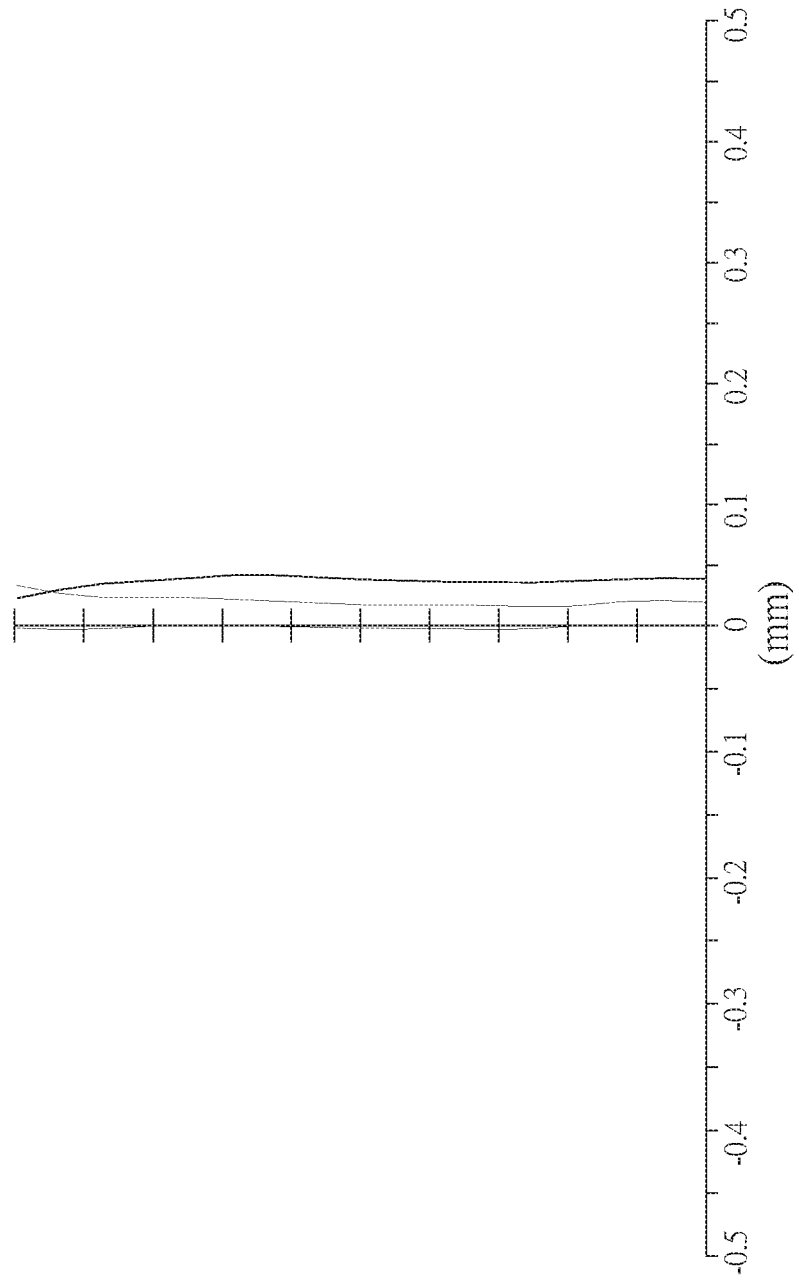

FIXED-FOCUS PROJECTION LENS

BACKGROUND OF THE INVENTION

1. Technical Field

The present invention generally relates to projection lens, and more particularly to a fixed-focus projection lens.

2. Description of Related Art

In recent years, with advantages in technology, it becomes more popular to use a projector to give presentations, hold a video conference, or watch television programs. Various kinds of small and lightweight projectors are designed and manufactured in pursuit of better portability and easier use, and therefore, the size of the lens used in a projector is demanded to become smaller.

With the development of high resolution in projection technology, the lens of projector is required to provide higher image quality and lower distortion. However, in order to achieve the required performance, a lens either has to include more than ten lenses for compensation, leading to a bulky and heavy projector, or has to use a lens with greater processing difficulty. Such solutions seem to contradict with the trend of miniaturization.

BRIEF SUMMARY OF THE INVENTION

In view of the reasons mentioned above, the primary objective of the present invention is to provide a fixed-focus projection lens, of which the total length is short, and has an optical performance of high image quality and low distortion.

The present invention provides a fixed-focus projection lens, which, in order from an image side to an image source side along an optical axis, comprises a first lens, a second lens, a third lens, a fourth lens, a fifth lens, and a sixth lens, wherein, while projecting, a light passes intoenters the fixed-focus projection lens through from the image source side, and passes out ofthrough the fixed-focus projection lens through to the image side. The first lens has a negative refractive power. The second lens is a biconvex lens with a positive refractive power. The third lens has a negative refractive power. The fourth lens has a positive refractive power. The fifth lens has a positive refractive power; and the sixth lens has a positive refractive power.

In an embodiment, the first lens is a negative meniscus, and a convex surface thereof faces the image side; the third lens is a biconcave lens; the fourth lens is a biconvex lens; the fifth lens is a biconvex lens; the sixth lens is a meniscus lens.

In an embodiment, at least one surface of the first lens is aspherical; at least one surface of the sixth lens is aspherical.

In an embodiment, both surfaces of the first lens and both surfaces of the sixth lens are aspherical.

In an embodiment, both surfaces of the second lens, the third lens, the fourth lens, and the fifth lens are spherical.

In an embodiment, the third lens and the fourth lens are adhered together to form a doublet lens with negative refractive power.

In an embodiment, the doublet lens satisfies the following conditions: $-2.02 \leq fc/f \leq -1.78$; where f is a focal length of the fixed-focus projection lens, and fc is a focal length of the doublet lens.

In an embodiment, a distance between the third lens and the fourth lens is smaller than a distance between each adjacent lens of the fixed-focus projection lens.

In an embodiment, a radius of curvature of different segments on the at least one surface of the sixth lens is different.

In an embodiment, the radius of curvature of the at least one surface of the sixth lens decreases gradually from where the optical axis passes through to a side of the sixth lens.

In an embodiment, the fixed-focus projection lens satisfies the following condition: $-1.74 \leq f1/f \leq -1.60$; where f is a focal length of the fixed-focus projection lens, and f1 is a focal length of the first lens.

In an embodiment, the fixed-focus projection lens satisfies the following condition: $2.02 \leq f2/f \leq 2.17$; where f is a focal length of the fixed-focus projection lens, and f2 is a focal length of the second lens.

In an embodiment, the fixed-focus projection lens satisfies the following condition: $-0.85 \leq f3/f \leq -0.80$; where f is a focal length of the fixed-focus projection lens, and f3 is a focal length of the third lens.

In an embodiment, the fixed-focus projection lens satisfies the following condition: $1.66 \leq f4/f \leq 1.81$; where f is a focal length of the fixed-focus projection lens, and f4 is a focal length of the fourth lens.

In an embodiment, the fixed-focus projection lens satisfies the following condition: $1.81 \leq f5/f \leq 1.89$; where f is a focal length of the fixed-focus projection lens, and f5 is a focal length of the fifth lens.

In an embodiment, the fixed-focus projection lens satisfies the following condition: $3.33 \leq f6/f \leq 3.50$; where f is a focal length of the fixed-focus projection lens, and f6 is a focal length of the sixth lens.

In an embodiment, a refractive index of the second lens is greater than 1.8.

In an embodiment, a refractive index of the fifth lens is greater than 1.7.

In an embodiment, an aperture provided between the second lens and the third lens.

With the aforementioned design, the fixed-focus projection lens of the present invention could achieve the effect of high image quality and low distortion. In addition, the number of the lens of the fixed-focus projection lens is limited to six, which reduces the volume and helps to keep the fixed-focus projection lens miniaturized and lightweight. Furthermore, the fixed-focus projection lens of the present invention could be easily manufactured and assembled.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 6C is a diagram showing the longitudinal spherical aberration of the third embodiment.

DETAILED DESCRIPTION OF THE INVENTION

Figure 1:
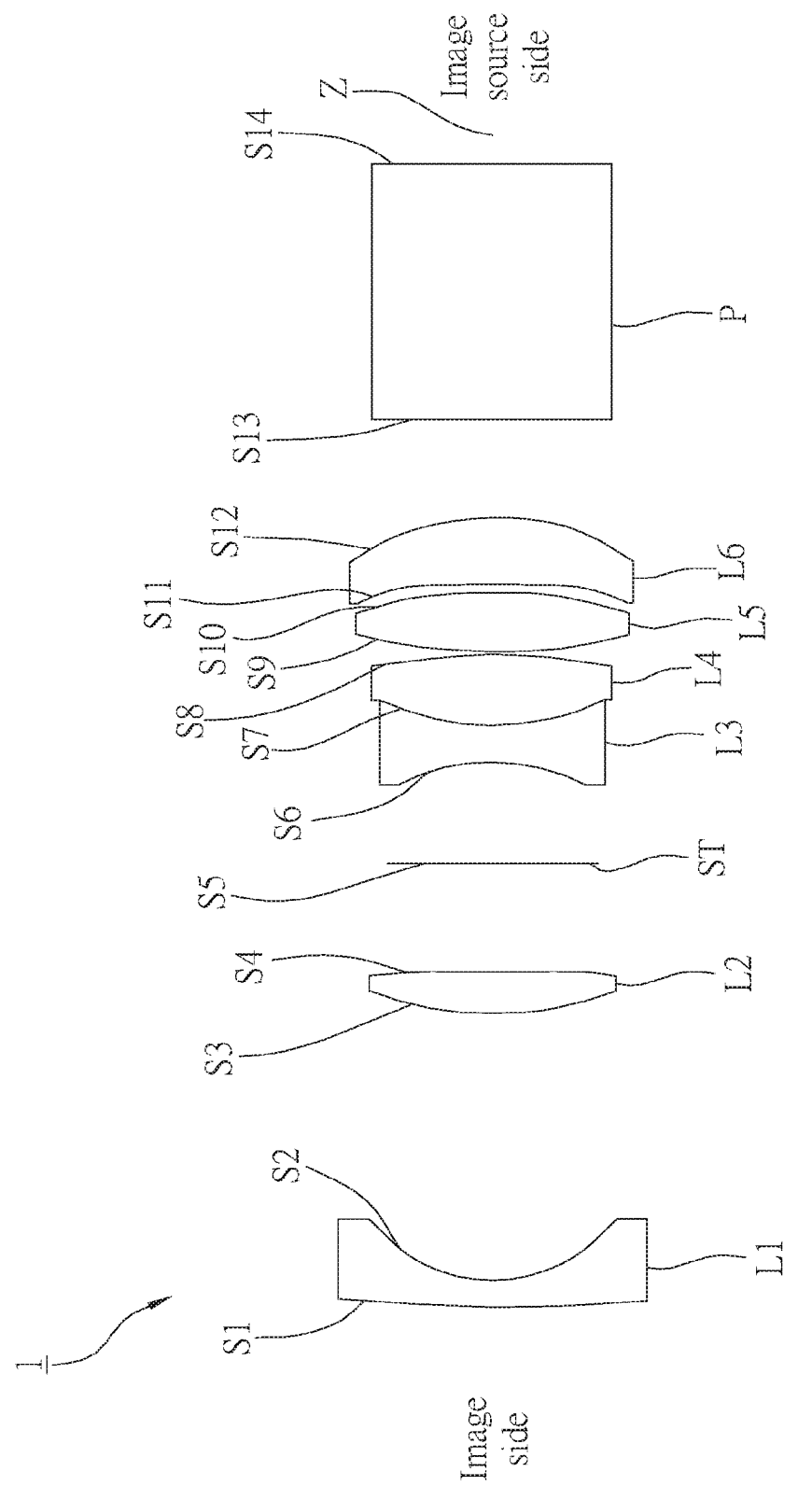
FIG. 1 is a schematic diagram of a first embodiment of the present invention.
Figure 3:
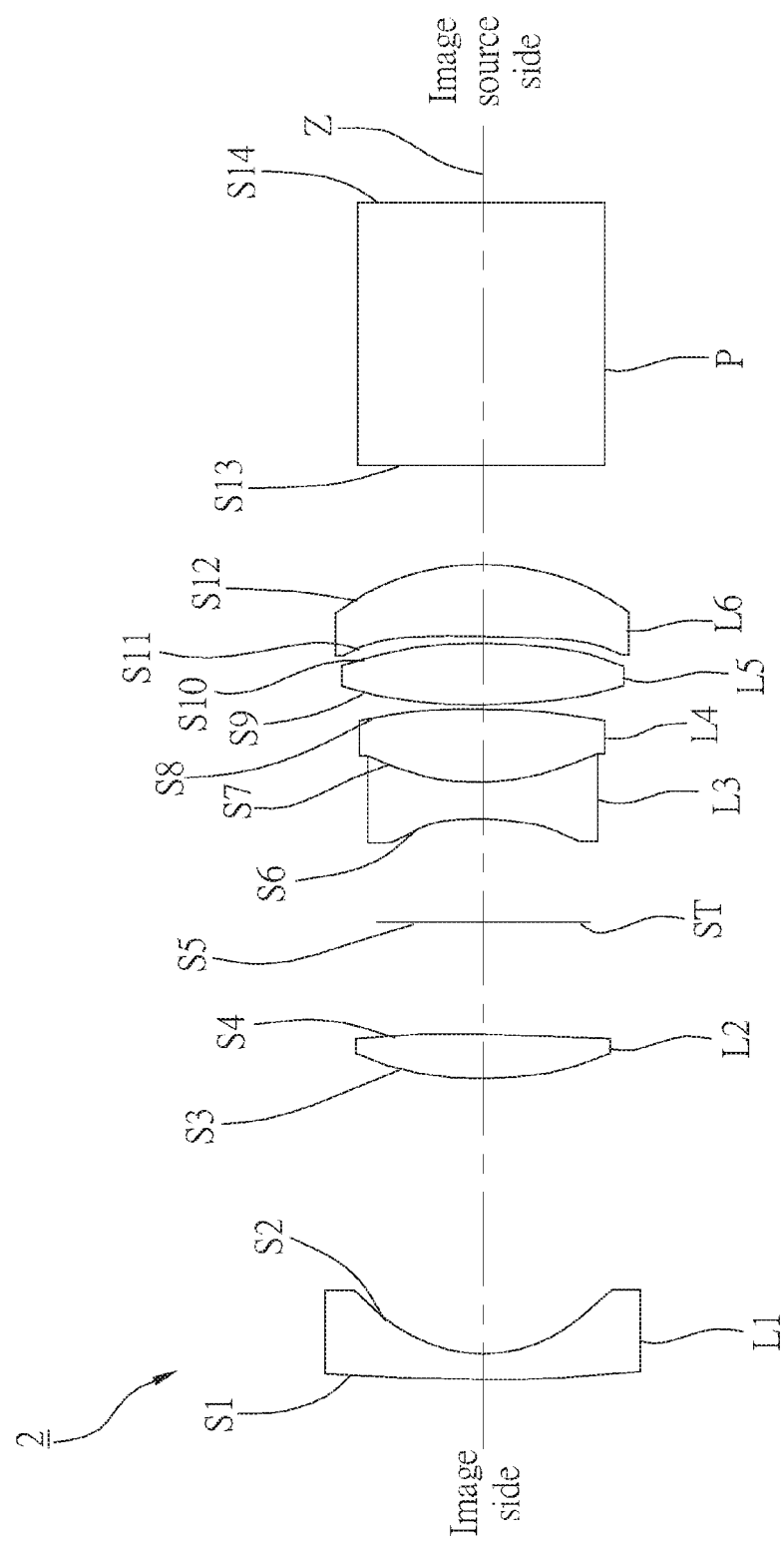
FIG. 3 is a schematic diagram of a second embodiment of the present invention.
Figure 5:
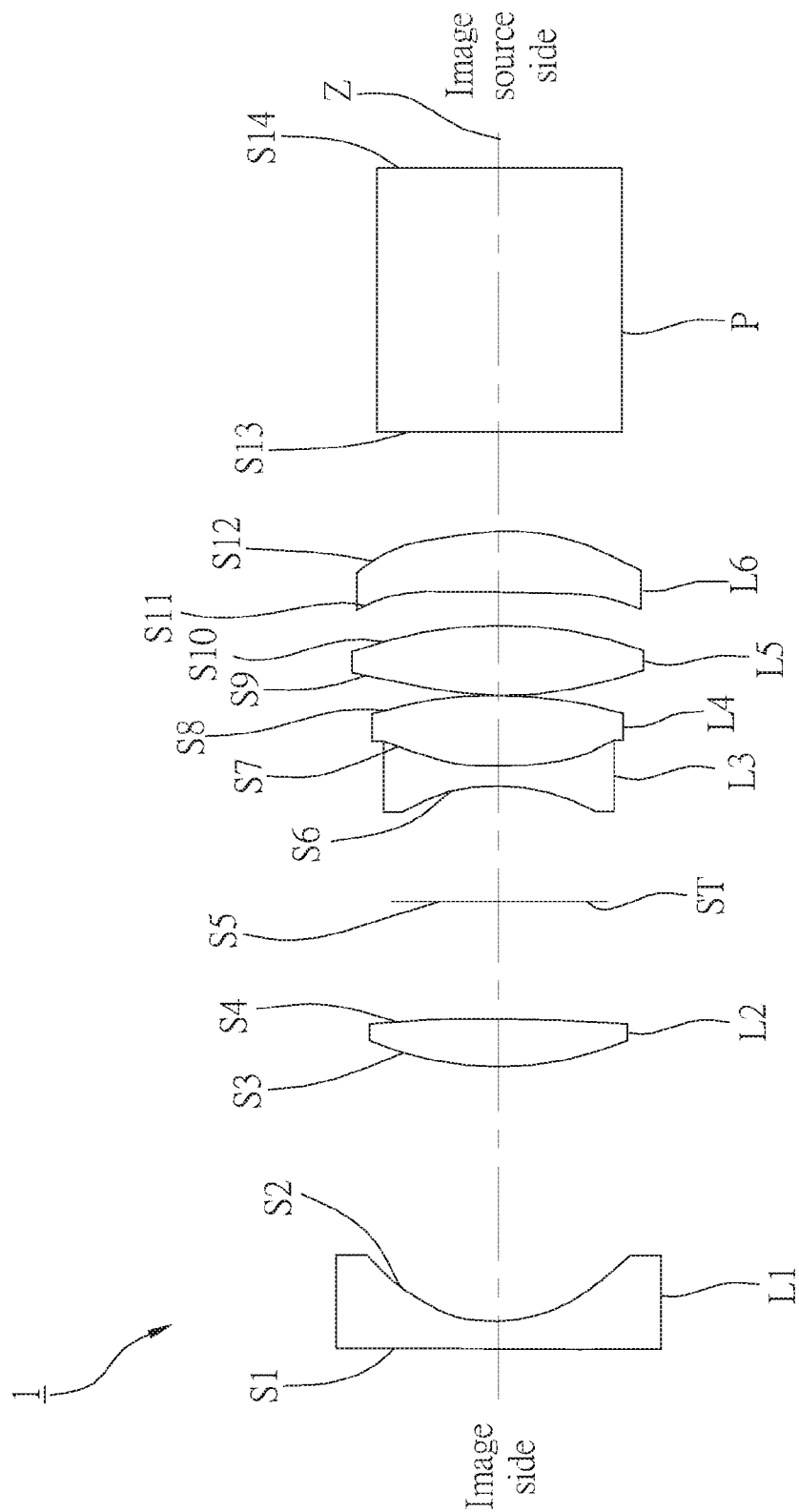
FIG. 5 is a schematic diagram of a third embodiment of the present invention.

A fixed-focus projection lens 1 of a first embodiment of the present invention is illustrated in FIG. 1; a fixed-focus projection lens 2 of a second embodiment of the present invention is illustrated in FIG. 3, and a fixed-focus projection lens 3 of a third embodiment of the present invention is illustrated in FIG. 5. Each of the aforementioned fixed-focus projection lens 1, 2, 3 has a first lens L1, a second lens L2, a third lens L3, a fourth lens L4, a fifth lens L5, and a sixth lens L6, which are arranged in order from an image side to an image source side along an optical axis Z. While projecting, a light enters the fixed-focus projection lens from the image source side, passes through each fixed-focus projection lens 1, 2, 3, and eventuall arrives at the image side. Furthermore, to meet different requirements, an aperture ST is provided between the second lens L2 and the third lens L3, and a prism P is provided behind the sixth lens L6 (i.e., near the image source side), and therefore enhances the optical quality.

The first lens L1 has negative refractive power. Preferably, the first lens L1 of each of the three embodiments of the present invention is a meniscus with negative refractive power, wherein a convex surface S1 thereof faces the image side, while a concave surface S2 thereof faces the image source side. Furthermore, at least one surface of the first lens L1 is aspherical. Preferably, both sides of the first lens L1 of each of the three embodiments of the present invention are aspherical. Since the surface of an aspherical lens is curved, it helps to lower a spherical aberration which might happen for a spherical lens, and to reduce the number of lens. Whereby, the lens quality could be enhanced, the optical system could be shortened, and the distortion could be effectively lowered.

The second lens L2 is a biconvex lens with positive refractive power. Preferably, a refractive index of the second lens L2 of each of the three embodiments of the present invention is greater than 1.8. The higher refractive index is, the thinner lens would be. In this way, a weight of the fixed-focus projection lens 1, 2, 3 could be lighter, and a volume of the fixed-focus projection lens 1, 2, 3 could be reduced.

The third lens L3 has negative refractive power, and the fourth lens L4 has positive refractive power, wherein a distance between the third lens L3 and the fourth lens L4 is less than a distance between any two adjacent lens in the fixed-focus projection lens. Preferably, the third lens L3 of each of the three embodiments of the present invention is a biconcave lens, while the fourth lens L4 of each of the three embodiments of the present invention is a biconvex lens. The third lens L3 and the fourth lens L4 are adhered together to form a doublet lens with negative refractive power. With the doublet lens and others lenses, an axial chromatic aberration could be effectively eliminated.

The fifth lens L5 has positive refractive power. Preferably, the fifth lens L5 of the three embodiments of the present invention is a biconvex lens, wherein a refractive index of the fifth lens L5 is greater than 1.7. The higher refractive index is, the thinner lens would be. In this way, the weight of the fixed-focus projection lens 1, 2, 3 could be lighter, and the volume of the fixed-focus projection lens 1, 2, 3 could be reduced.

The sixth lens L6 has positive refractive power. Preferably, the sixth lens L6 of each of the three embodiments of the present invention is a meniscus lens, which includes at least one aspherical surface, wherein a concave surface S11 thereof faces the image side, and a value of a radius of curvature of the concave surface decreases gradually from where the optical axis Z passes through to a side of the sixth lens L6. Whereby, an incident angle of a chief ray entering the image side could be decreased, and the spherical aberration and a stigmatism could be reduced, which could increase a discernibility of the fixed-focus projection lens. The convex surface S12 faces the image source side, which helps to lower an aberration.

In order to effectively enhance the optical quality of the fixed-focus projection lens, the effective focal length (EFL) at where the optical axis Z passes through, a F number (Fno) of the aperture, a distortion, a radius of curvature (R), a distance (D) between each surface and the next surface on the optical axis Z, a refractive index (Nd) of each lens, an Abbe number (Vd) of each lens, half of the effective aperture of each surface, and a focal length of each of the fixed-focus projection lenses 1, 2, 3 of the three embodiments on the present invention are respectively listed in the following Table 1 to Table 3.

TABLE 1

| EFL = 16.735 mm; Fno = 1.4 | | | | | | | |
|---|---|---|---|---|---|---|---|
| Surface | R(mm) | D(mm) | Nd | Vd | Half of the Effective Aperture (mm) | Focal length (mm) | Note |
| S1 | 137.2502 | 2.67918 | 1.525279 | 55.95076 | 31.02808 | −27.922 | First lens L1 |
| S2 | 13.20725 | 27.03838 | | | 24.9 | | |
| S3 | 33.97213 | 4.225561 | 1.834000 | 37.16049 | 24.7 | 34.597 | Second lens L2 |
| S4 | −187.736 | 10.93017 | | | 24.4 | | |

TABLE 1-continued

EFL = 16.735 mm; Fno = 1.4

| Surface | R(mm) | D(mm) | Nd | Vd | Half of the Effective Aperture (mm) | Focal length (mm) | Note |
|---|---|---|---|---|---|---|---|
| S5 | Infinity | 10.29608 | | | 20.6203 | | Aperture ST |
| S6 | −20.8406 | 3.720065 | 1.784723 | 25.68345 | 18.5 | −13.863 | Third lens L3 |
| S7 | 24.97922 | 7.16298 | 1.618000 | 63.3335 | 22.6 | 29.197 | Fourth lens L4 |
| S8 | −58.5681 | 0.22863 | | | 24.1 | | |
| S9 | 52.27049 | 6.060089 | 1.772499 | 49.59837 | 26.93156 | 30.996 | Fifth lens L5 |
| S10 | −42.2814 | 0.670936 | | | 27.3 | | |
| S11 | −1977.21 | 6.877584 | 1.525279 | 55.95076 | 27.12 | 56.633 | Sixth lens L6 |
| S12 | −29.4531 | 9.91922 | | | 28.5 | | |
| S13 | Infinity | 25.75 | 1.516800 | 64.16734 | 24.13676 | | Prism P |
| S14 | Infinity | 0.1 | | | 18.98573 | | |
| S15 | Infinity | 0.023972 | | | 18.95545 | | Image source |
| S16 | Infinity | | | | 18.94819 | | |

TABLE 2

EFL = 16.941 mm; Fno = 1.4

| Surface | R(mm) | D(mm) | Nd | Vd | Half of the Effective Aperture (mm) | Focal length (mm) | Note |
|---|---|---|---|---|---|---|---|
| S1 | 137.2502 | 2.67918 | 1.525279 | 55.95076 | 31.02943 | −27.921 | First lens L1 |
| S2 | 13.20725 | 27.03838 | | | 24.9 | | |
| S3 | 33.97213 | 4.225561 | 1.834 | 37.16049 | 24.7 | 34.619 | Second lens L2 |
| S4 | −187.736 | 10.93017 | | | 24.4 | | |
| S5 | Infinity | 10.29608 | | | 20.6203 | | Aperture ST |
| S6 | −20.8406 | 3.720065 | 1.784723 | 25.68345 | 18.5 | −13.901 | Third lens L3 |
| S7 | 24.97922 | 7.16298 | 1.618 | 63.3335 | 22.6 | 30.278 | Fourth lens L4 |
| S8 | −58.5681 | 0.22863 | | | 24.1 | | |
| S9 | 52.27049 | 6.060089 | 1.772499 | 49.59837 | 26.93156 | 31.006 | Fifth lens L5 |
| S10 | −42.2814 | 0.670936 | | | 27.3 | | |
| S11 | −1977.21 | 6.877584 | 1.525279 | 55.95076 | 27.12 | 56.66 | Sixth lens L6 |
| S12 | −29.4531 | 9.91922 | | | 28.5 | | |
| S13 | Infinity | 25.75 | 1.5168 | 64.16734 | 24.13888 | | Prism P |
| S14 | Infinity | 0.1 | | | 18.98578 | | |
| S15 | Infinity | 0.023972 | | | 18.95548 | | Image source |
| S16 | Infinity | | | | 18.94822 | | |

TABLE 3

EFL = 16.458 mm; Fno = 1.4

| Surface | R(mm) | D(mm) | Nd | Vd | Half of the Effective Aperture (mm) | Focal length (mm) | Note |
|---|---|---|---|---|---|---|---|
| S1 | 129.0124 | 3.705238 | 1.525160 | 56.281538 | 31.75174 | −28.226 | First lens L1 |
| S2 | 13.20766 | 27.59851 | | | −0.36042 | | |
| S3 | 35.02584 | 4.400845 | 1.834000 | 37.160494 | 25.10351 | 34.853 | Second lens L2 |
| S4 | −166.657 | 11.62094 | | | 24.4 | | |
| S5 | Infinity | 9.265208 | | | 20.06 | | Aperture ST |

TABLE 3-continued

EFL = 16.458 mm; Fno = 1.4

| Surface | R(mm) | D(mm) | Nd | Vd | Half of the Effective Aperture (mm) | Focal length (mm) | Note |
|---|---|---|---|---|---|---|---|
| S6 | −20.794 | 4.128043 | 1.784723 | 25.68344 | 18.54669 | −13.609 | Third lens L3 |
| S7 | 24.2859 | 6.783116 | 1.662992 | 58.165770 | 22.06738 | 28.274 | Fourth lens L4 |
| S8 | −58.0064 | 0.143169 | | | 24.00526 | | |
| S9 | 52.40851 | 5.711219 | 1.772499 | 598366 | 26.6 | 30.737 | Fifth lens L5 |
| S10 | −41.6739 | 0.377883 | | | 27.15382 | | |
| S11 | −1196.02 | 6.212418 | 1.525120 | 56.281538 | 27.13423 | 56.833 | Sixth lens L6 |
| S12 | −29.278 | 10.58329 | | | 28.5 | | |
| S13 | Infinity | 24.72 | 1.5168 | 64.16734 | 23.91351 | | Prism P |
| S14 | Infinity | 0.1 | | | 18.98121 | | |
| S15 | Infinity | 0 | | | 18.95095 | | Image source |
| S16 | Infinity | | | | 18.95095 | | |

It can be seen from Table 1 to Table 3 that, the refractive index of the second lens L2 of each of the fixed-focus projection lens 1, 2, 3 in the three embodiments of the present invention satisfies the aforementioned condition that the refractive index is greater than 1.8; the refractive index of the fifth lens L5 satisfies the aforementioned condition that the refractive index is greater than 1.7.

In addition, an image quality of the fixed-focus projection lens could be enhanced with the following conditions:

$-1.74 \leq f1/f \leq -1.60;$     (1)

$2.02 \leq f2/f \leq 2.17;$     (2)

$-0.85 \leq f3/f \leq -0.80;$     (3)

$1.66 \leq f4/f \leq 1.81;$     (4)

$1.81 \leq f5/f \leq 1.89;$     (5)

$3.33 \leq f6/f \leq 3.50;$     (6)

$-2.02 \leq fc/f \leq -1.78.$     (7)

Where f is the focal length of the fixed-focus projection lens 1, 2, 3; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; fc is a focal length of the doublet lens formed by the third lens L3 and the fourth lens L4. Where fc of the fixed-focus projection lens 1 of the first embodiment is −31.441 mm; fc of the fixed-focus projection lens 2 of the second embodiment is −30.095 mm, and fc of the fixed-focus projection lens 3 of the third embodiment is −31.54 mm.

The following Table 4 shows a full information of the fixed-focus projection lens 1, 2, 3 in the three embodiments of the present invention.

TABLE 4

| | Max | Min |
|---|---|---|
| f1/f | −1.64 | −1.73 |
| f2/f | 2.13 | 2.03 |
| f3/f | −0.81 | −0.84 |
| f4/f | 1.80 | 1.73 |

TABLE 4-continued

| | Max | Min |
|---|---|---|
| f5/f | 1.88 | 1.84 |
| f6/f | 3.46 | 3.35 |
| fc/f | −1.77 | −1.93 |

Furthermore, a surface concavity Z(y) of each of the aspheric surfaces S1, S2, S11, S12 in the three embodiments of the present invention is defined by the following formula:

$$Z(y) = \frac{y^2}{R\left(1 + \sqrt{1 - (1+K)y/R^2}\right)^2} + Ar^4 + Br^6 + Cr^8 + Dr^{10} + Er^{12} + Fr^{14} + Gr^{16}$$

where:

Z(y) is the surface concavity (i.e. a variable of the optical axis varies with y);

y is a height perpendicular to the optical axis;

r is half the off-axis height of the surface;

R is the radius of curvature

K is a conic constant; and

A-G respectively represents different order coefficient of r.

The conic constant k of each of the aspheric surfaces S1, S2, S11, S12 and each order coefficient A-G of each of the fixed-focus projection lenses 1, 2, 3 in the three embodiments of the present invention are respectively listed in the following Tables 5-7.

TABLE 5

| Conic constant | Aspheric surface | | | |
|---|---|---|---|---|
| | 1 | 2 | 11 | 12 |
| K | 0 | −0.36145 | 0 | 0.374933 |
| A(4th) | 1.20E−06 | −1.48E−05 | −3.42E−05 | −7.41E−06 |
| B(6th) | −4.12E−08 | −1.55E−07 | −4.30E−08 | −3.11E−08 |
| C(8th) | 1.96E−10 | 3.73E−10 | −3.38E−10 | −1.86E−10 |
| D(10th) | −4.64E−13 | −1.60E−12 | 1.48E−12 | 7.99E−13 |

TABLE 5-continued

| Conic | Aspheric surface | | | |
|---|---|---|---|---|
| constant | 1 | 2 | 11 | 12 |
| E(12th) | 4.57E−16 | −1.62E−15 | −4.86E−15 | −2.14E−15 |
| F(14th) | 0 | 0 | 0 | 0 |
| G(16th) | 0 | 0 | 0 | 0 |

TABLE 6

| Conic | Aspheric surface | | | |
|---|---|---|---|---|
| constant | 1 | 2 | 11 | 12 |
| K | 0 | −0.36145 | 0 | 0.374933 |
| A(4th) | 1.20E−06 | −1.48E−05 | −3.42E−05 | −7.41E−06 |
| B(6th) | −4.12E−08 | −1.55E−07 | −4.30E−08 | −3.11E−08 |
| C(8th) | 1.96E−10 | 3.73E−10 | −3.38E−10 | −1.86E−10 |
| D(10th) | −4.64E−13 | −1.60E−12 | 1.48E−12 | 7.99E−13 |
| E(12th) | 4.57E−16 | −1.62E−15 | −4.86E−15 | −2.14E−15 |
| F(14th) | 0 | 0 | 0 | 0 |
| G(16th) | 0 | 0 | 0 | 0 |

TABLE 7

| Conic | Aspheric surface | | | |
|---|---|---|---|---|
| constant | 1 | 2 | 11 | 12 |
| K | 0 | −0.36042 | 0 | 0.352917 |
| A(4th) | 1.33E−06 | −1.40E−05 | −3.36E−05 | −7.26E−06 |
| B(6th) | −4.04E−08 | −1.58E−07 | −4.45E−08 | −3.02E−08 |
| C(8th) | 1.93E−10 | 3.71E−10 | −3.34E−10 | −1.96E−10 |
| D(10th) | −4.81E−13 | −1.55E−12 | 1.50E−12 | 7.23E−13 |
| E(12th) | 5.11E−16 | −1.84E−15 | −5.55E−15 | −2.34E−15 |
| F(14th) | 0 | 0 | 0 | 0 |
| G(16th) | 0 | 0 | 0 | 0 |

Figure 2A:
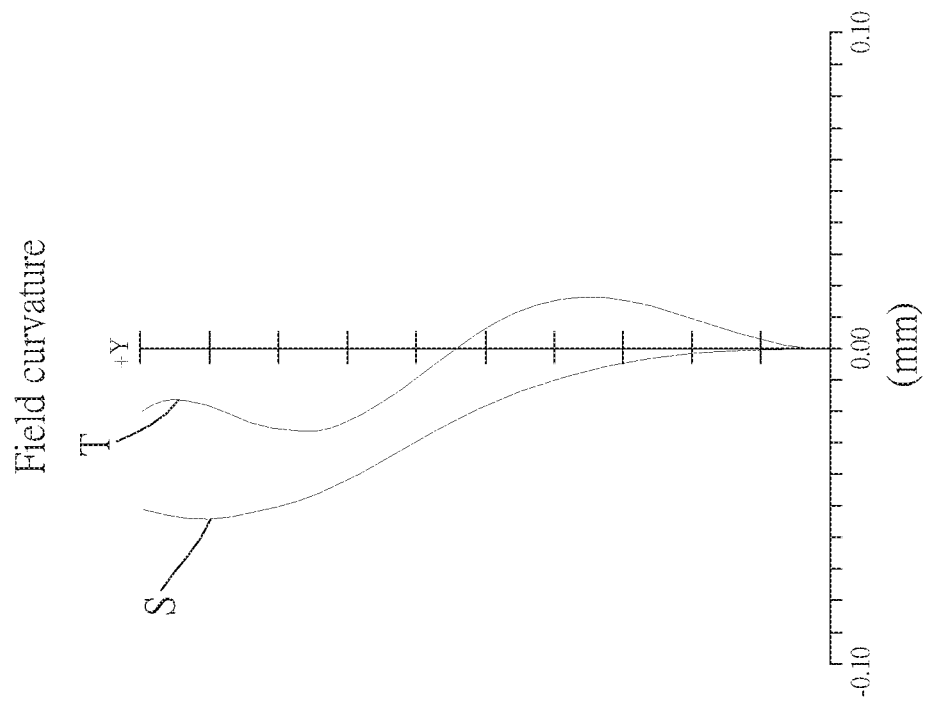
FIG. 2A is a diagram showing the field curvature of the first embodiment.
Figure 4:
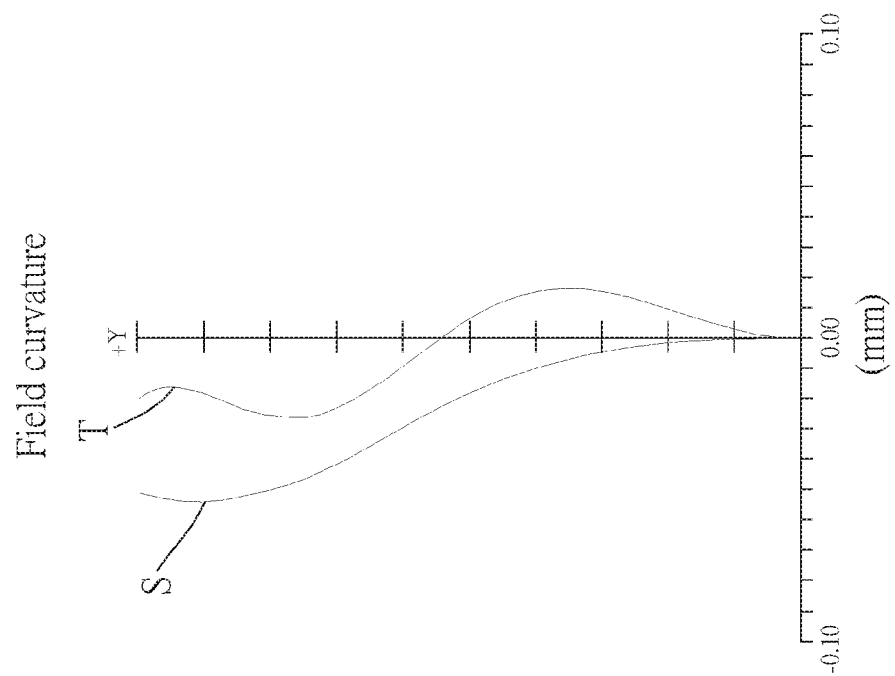
FIG. 4A is a diagram showing the field curvature of the second embodiment.
FIG. 4B is a diagram showing the distortion of the second embodiment.
FIG. 4C is a diagram showing the longitudinal spherical aberration of the second embodiment.
FIG. 4D is a diagram showing the focus shift of the second embodiment.
Figure 4:
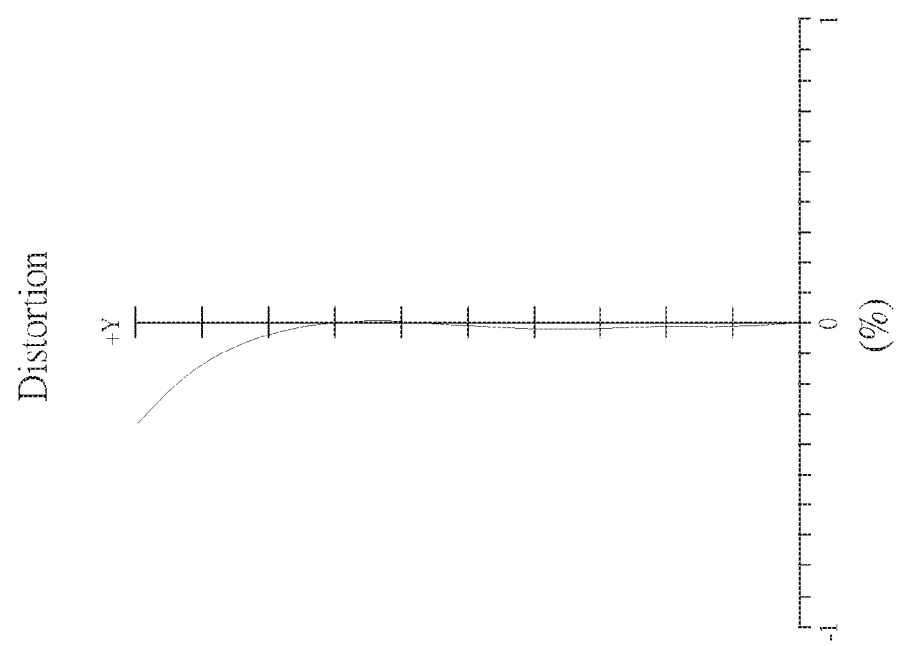
Figure 6A:
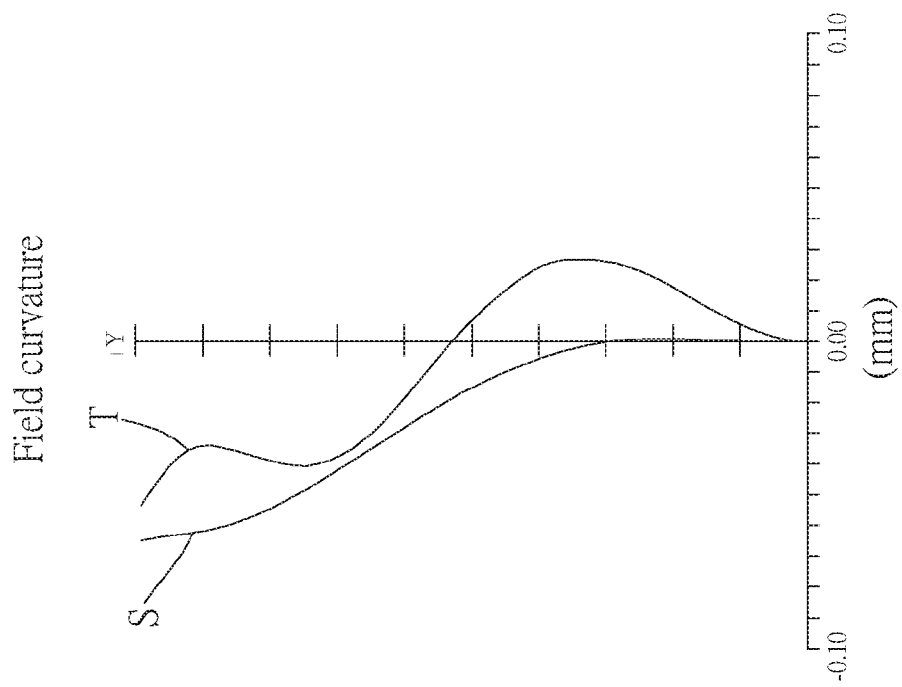
FIG. 6A is a diagram showing the field curvature of the third embodiment.

With the aforementioned design, FIG. 2A shows a diagram of the field curvature of the first embodiment, wherein a maximum field curvature thereof does not exceed 0.02 mm and −0.06 mm; FIG. 4A shows a diagram of the field curvature of the second embodiment, wherein a maximum field curvature thereof does not exceed 0.02 mm and −0.06 mm; FIG. 6A shows a diagram of the field curvature of the third embodiment, wherein a maximum field curvature thereof does not exceed 0.03 mm and −0.07 mm. It is obvious that the fixed-focus projection lens of the present invention can effectively lower the field curvature.

Figure 2B:
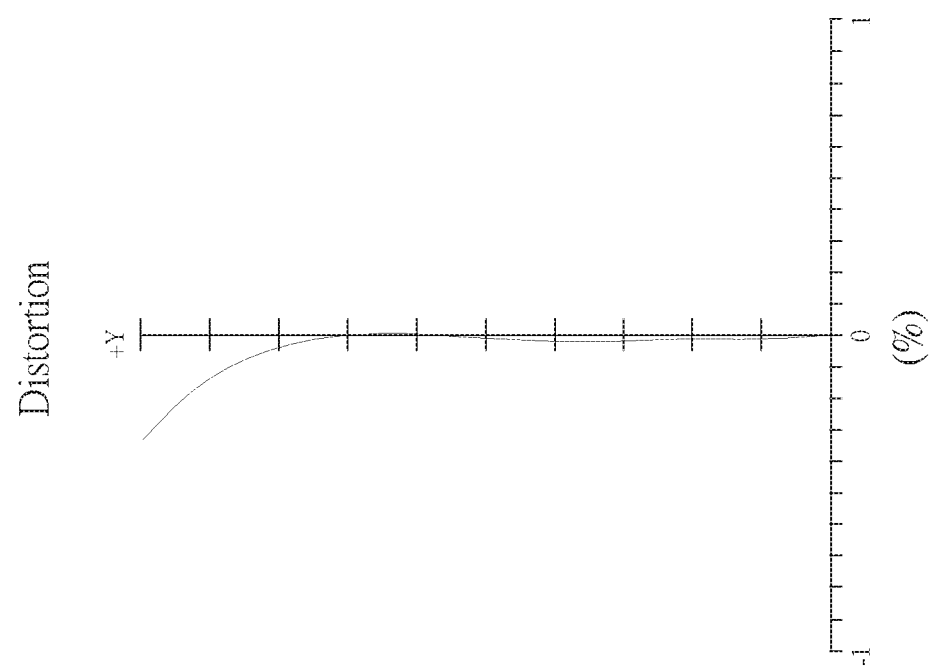
FIG. 2B is a diagram showing the distortion of the first embodiment.
Figure 6B:
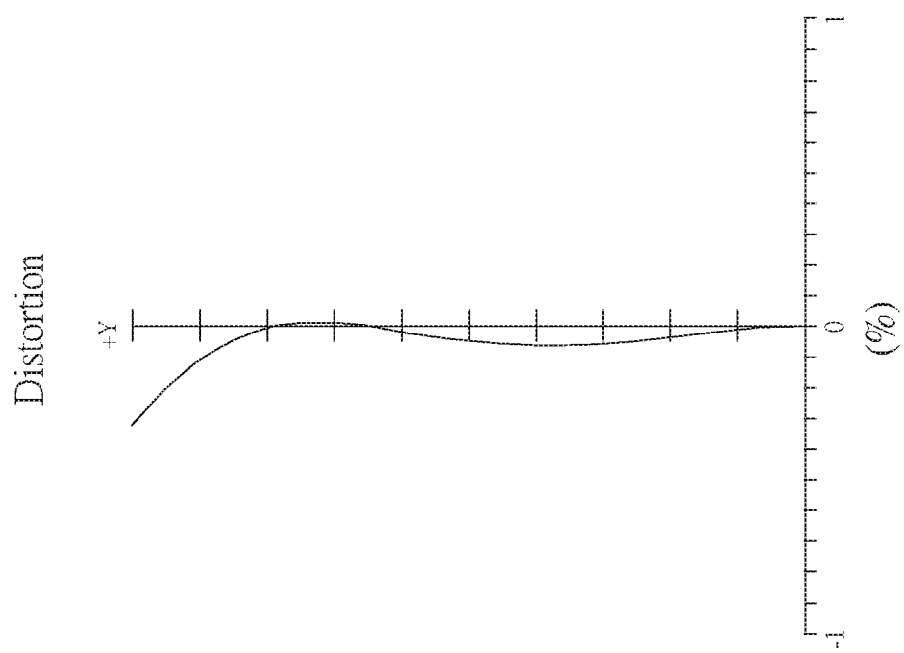
FIG. 6B is a diagram showing the distortion of the third embodiment.

FIG. 2B shows a diagram of a distortion of the first embodiment, wherein a distortion thereof is from −0.4% to 0.1%; FIG. 4B shows a diagram of a distortion of the second embodiment, wherein a distortion thereof is from −0.4% to 0.1%; FIG. 6B shows a diagram of a distortion of the third embodiment, wherein a distortion thereof is from −0.4% to 0.1%. It is obvious that the fixed-focus projection lens of the present invention can effectively control the distortion.

Figure 2C:
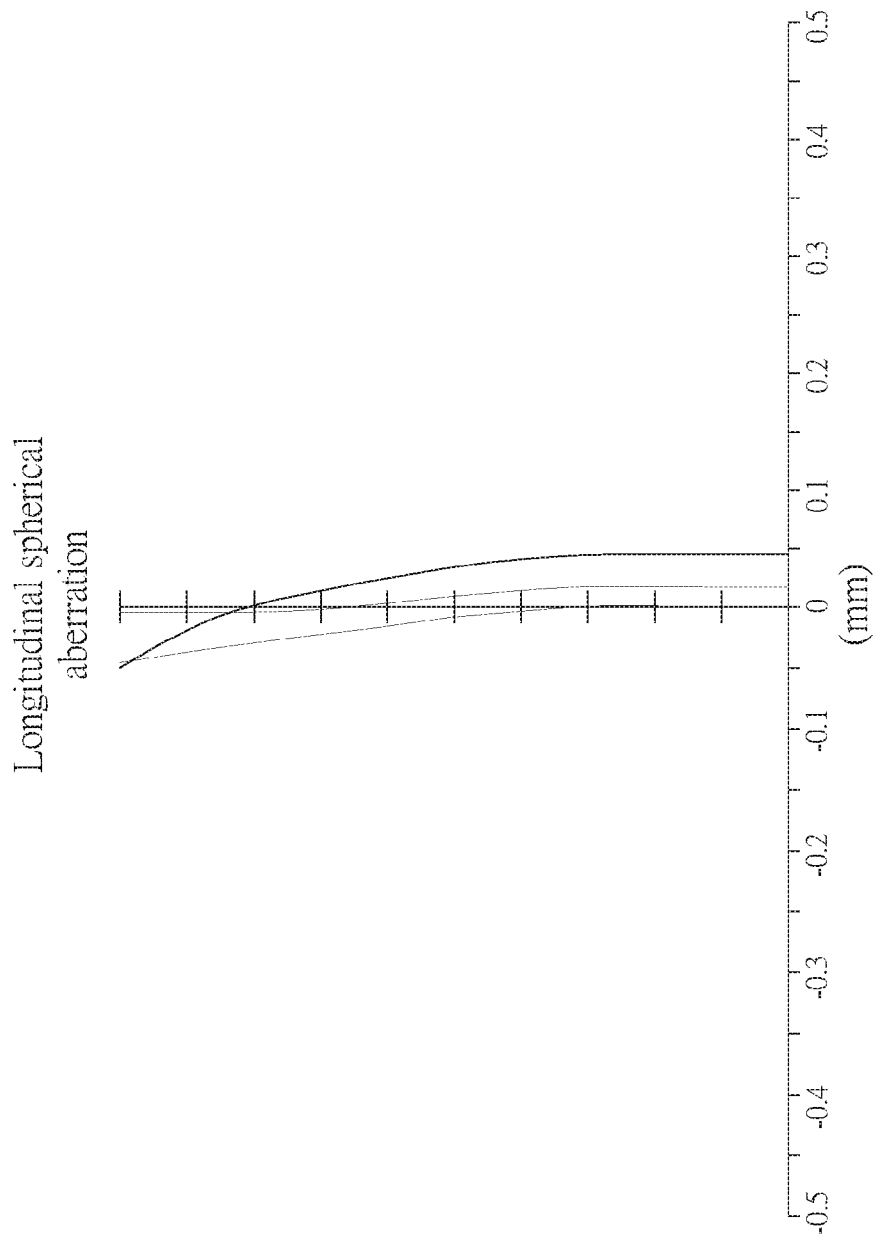
FIG. 2C is a diagram showing the longitudinal spherical aberration of the first embodiment.
Figure 4C:
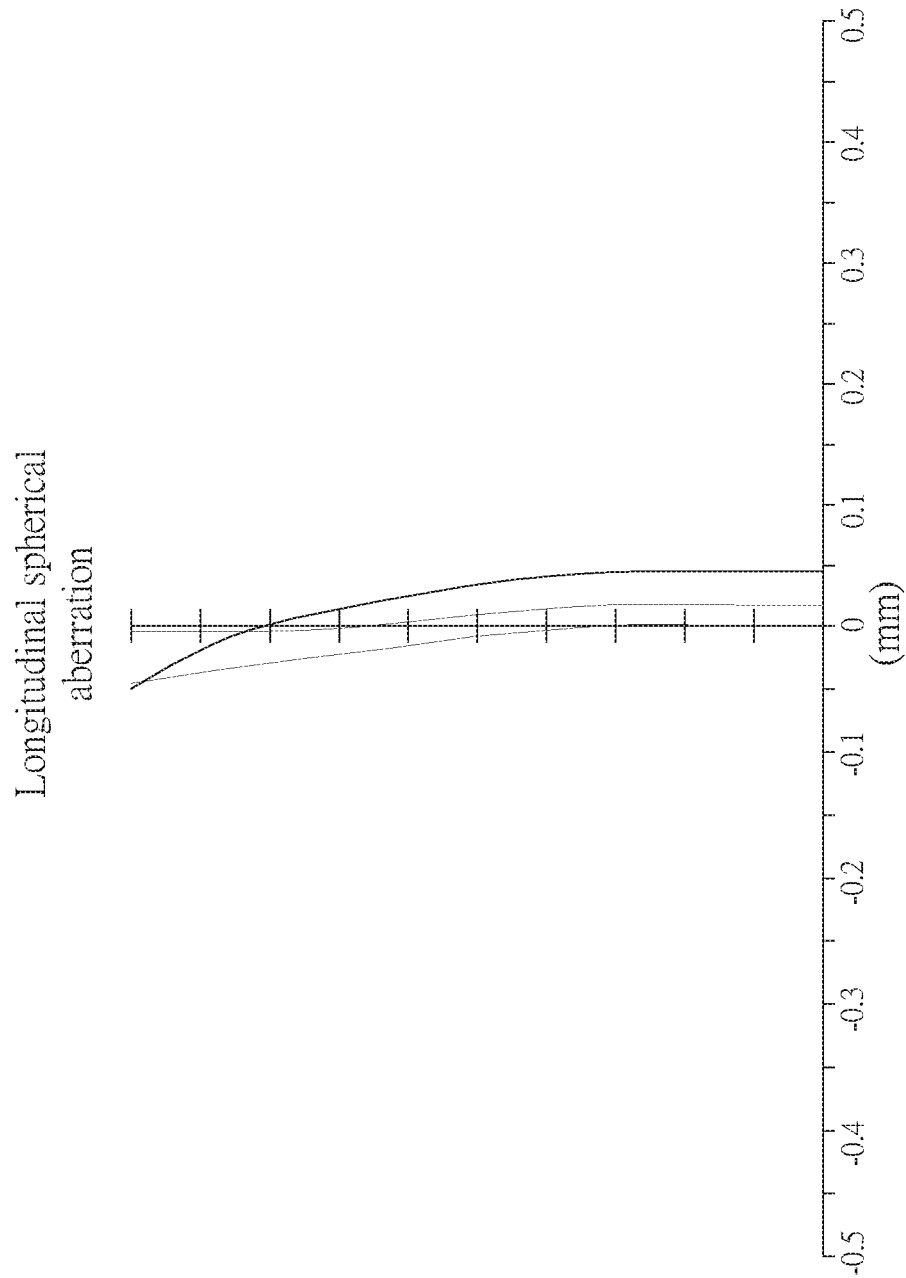

FIG. 2C shows a diagram of a longitudinal spherical aberration of the first embodiment, wherein an offset of the longitudinal spherical aberration thereof is from −0.05 mm to 0.05 mm; FIG. 4C shows a diagram of a longitudinal spherical aberration of the second embodiment, wherein an offset of the longitudinal spherical aberration thereof is from −0.05 mm to 0.05 mm; FIG. 6C shows a diagram of a longitudinal spherical aberration of the third embodiment, wherein an offset of the longitudinal spherical aberration thereof is from −0.05 mm to 0.05 mm. It is obvious that the fixed-focus projection lens of the present invention can effectively lower the longitudinal spherical aberration.

Figure 2D:
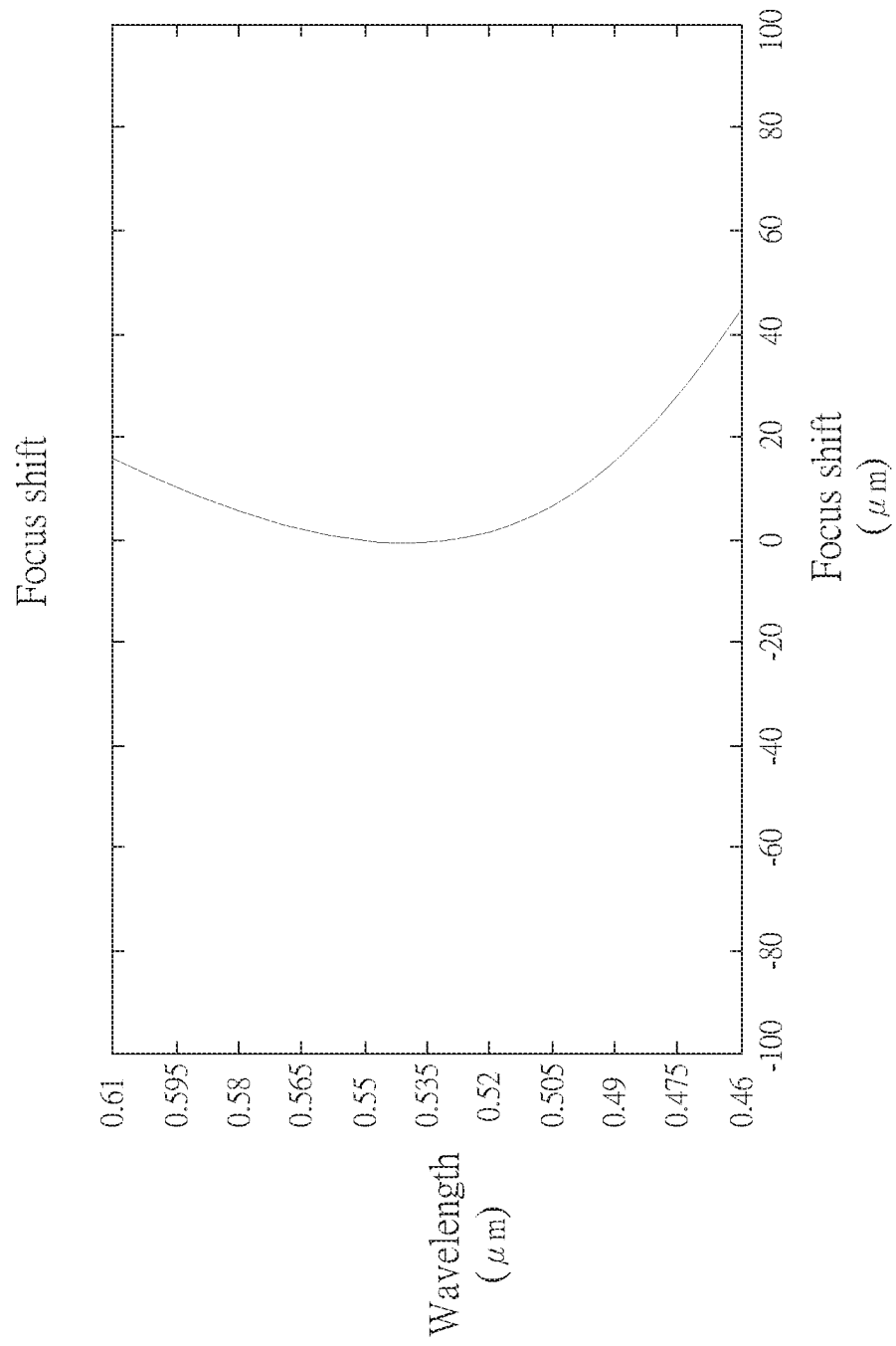
FIG. 2D is a diagram showing the focus shift of the first embodiment.
Figure 4D:
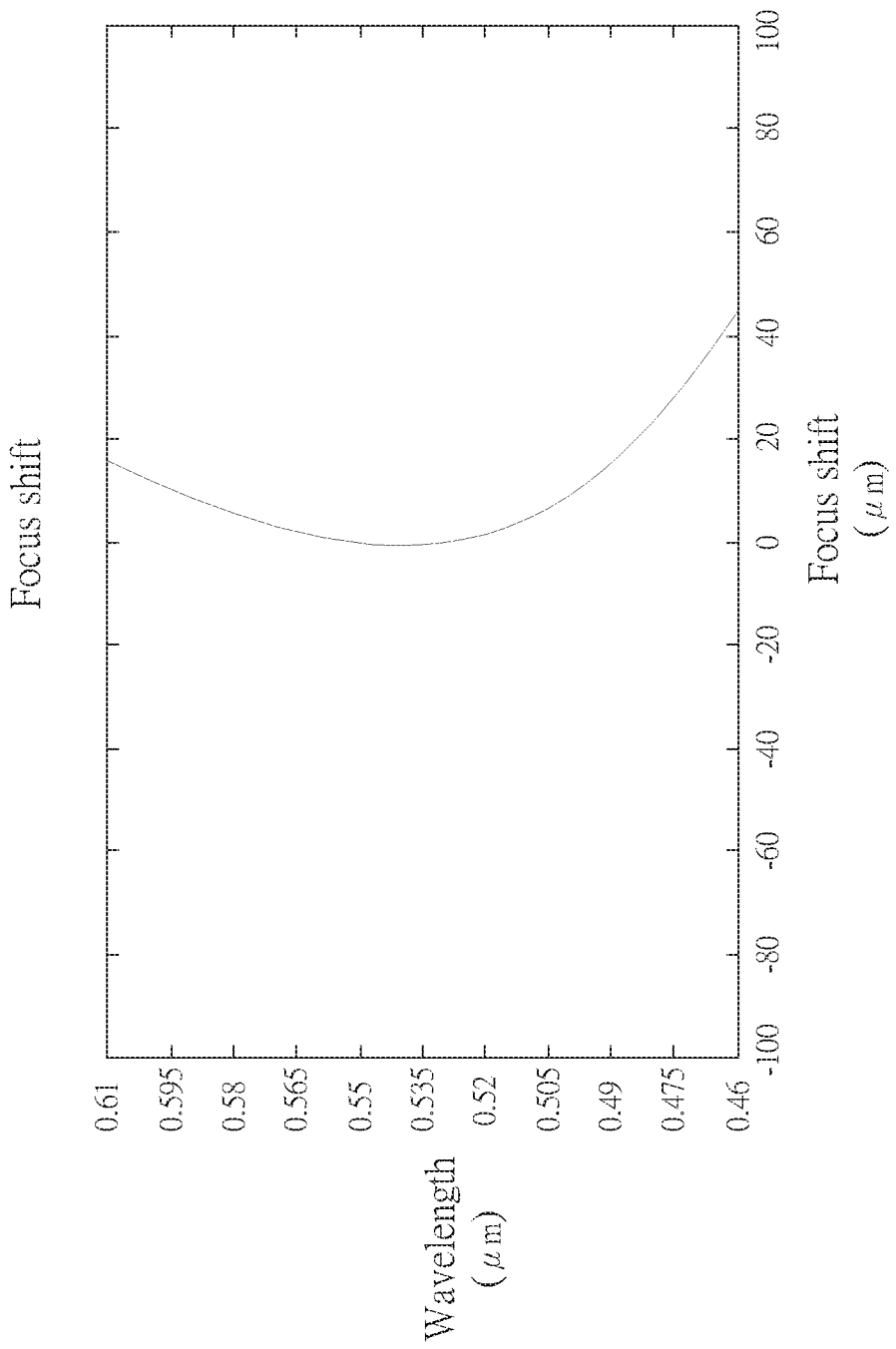
Figure 6D:
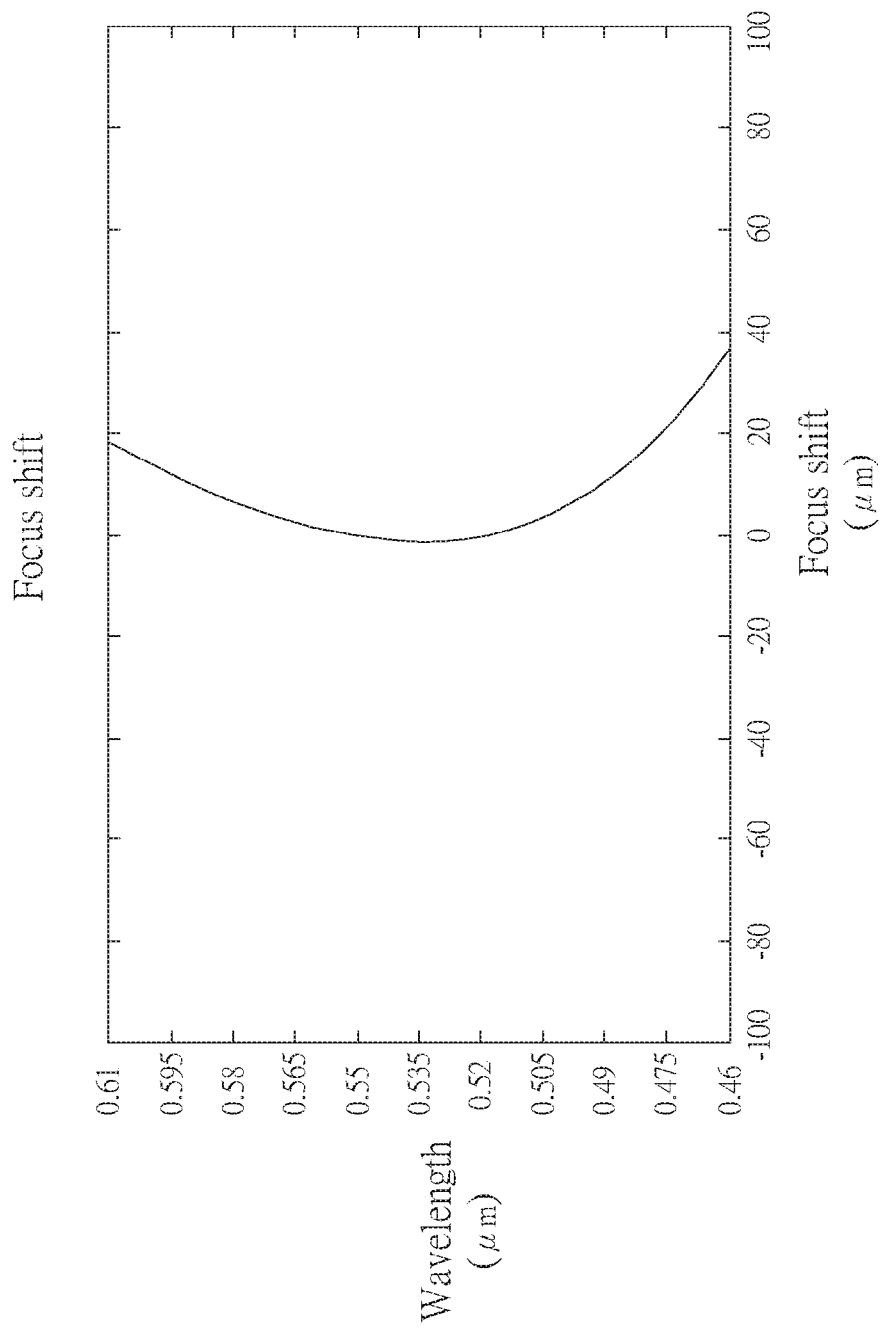
FIG. 6D is a diagram showing the focus shift of the third embodiment.

FIG. 2D shows a diagram of a focus shift of the first embodiment, wherein the focus shift thereof is from −20 μm to 60 μm; FIG. 4D shows a diagram of a focus shift of the second embodiment, wherein the focus shift thereof is from −20 μm to 40 μm; FIG. 6D shows a diagram of a focus shift of the third embodiment, wherein the focus shift thereof is from −20 μm to 40 μm. It is obvious that the fixed-focus projection lens of the present invention can effectively control the focus shift.

In conclusion, with the aforementioned arrangement and optical conditions, the number of lenses in each of the fixed-focus projection lenses 1, 2, 3 of the present invention is limited to six, which helps to keep each of the fixed-focus projection lenses 1, 2, 3 miniaturized and lightweight. In addition, the fixed-focus projection lens 1, 2, 3 of the present invention could be easily manufactured and assembled. Furthermore, the fixed-focus projection lens 1, 2, 3 of the present invention could correct the aberration, which helps to keep high image quality and low distortion.

It must be pointed out that the embodiments described above are only some preferred embodiments of the present invention. It is noted that, the negative meniscus of the first lens L1 is not a limitation of the present invention, and a biconcave lens with negative refractive power could be alternatively used as the first lens L1 to meet different environmental requirements; the biconcave lens of the third lens L3 is not a limitation of the present invention, and a negative meniscus with negative refractive power could be alternatively used as the third lens L3 to meet different environmental requirements; the biconvex lens of the fourth lens L4 is not a limitation of the present invention, and a meniscus lens with positive refractive power could be alternatively used as the fourth lens L4 to meet different environmental requirements; the biconvex lens of the fifth lens L5 is not a limitation of the present invention, and a meniscus lens with positive refractive power could be used as the fifth lens L5 to meet different environmental requirements; the meniscus lens of the sixth lens L6 is not a limitation of the present invention, and a biconvex lens with positive refractive power could be alternatively used as the sixth lens L6. All equivalent structures which employ the concepts disclosed in this specification and the appended claims should fall within the scope of the present invention.

What is claimed is:

1. A fixed-focus projection lens, in order from an image side to an image source side along an optical axis, comprises a first lens, a second lens, a third lens, a fourth lens, a fifth lens, and a sixth lens, wherein, while projecting, a light enters the fixed-focus projection lens from the image source side, and passes through the fixed-focus projection lens to the image side, wherein:
   the first lens has a negative refractive power;
   the second lens is a biconvex lens with a positive refractive power;
   the third lens has a negative refractive power;
   the fourth lens has a positive refractive power;
   the fifth lens has a positive refractive power; and
   the sixth lens has a positive refractive power;
   wherein the third lens and the fourth lens are adhered together to form a doublet lens with negative refractive power.

2. The fixed-focus projection lens of claim 1, wherein the first lens is a negative meniscus, and a convex surface thereof faces the image side; the third lens is a biconcave lens; the fourth lens is a biconvex lens; the fifth lens is a biconvex lens; the sixth lens is a meniscus lens.

3. The fixed-focus projection lens of claim 2, wherein at least one surface of the first lens is aspherical; at least one surface of the sixth lens is aspherical.

4. The fixed-focus projection lens of claim 3, wherein both surfaces of the first lens and both surfaces of the sixth lens are aspherical.

5. The fixed-focus projection lens of claim 4, wherein both surfaces of the second lens, the third lens, the fourth lens, and the fifth lens are spherical.

6. The fixed-focus projection lens of claim 3, wherein both surfaces of the second lens, the third lens, the fourth lens, and the fifth lens are spherical.

7. The fixed-focus projection lens of claim 3, wherein the third lens and the fourth lens are adhered together to form a doublet lens with negative refractive power.

8. The fixed-focus projection lens of claim 7, wherein the doublet lens satisfies the following conditions:

$-2.02 \leq fc/f \leq -1.78$, where f is a focal length of the fixed-focus projection lens, and fc is a focal length of the doublet lens.

9. The fixed-focus projection lens of claim 3, wherein a distance between the third lens and the fourth lens is smaller than a distance between each adjacent lens of the fixed-focus projection lens.

10. The fixed-focus projection lens of claim 3, wherein a radius of curvature of different segments on the at least one surface of the sixth lens is different.

11. The fixed-focus projection lens of claim 10, wherein the radius of curvature of the at least one surface of the sixth lens decreases gradually from where the optical axis passes through to a side of the sixth lens.

12. The fixed-focus projection lens of claim 2, wherein the third lens and the fourth lens are adhered together to form a doublet lens with negative refractive power.

13. The fixed-focus projection lens of claim 12, wherein the doublet lens satisfies the following conditions:

$-2.02 \leq fc/f \leq -1.78$;

where f is a focal length of the fixed-focus projection lens, and fc is a focal length of the doublet lens.

14. The fixed-focus projection lens of claim 2, wherein a distance between the third lens and the fourth lens is smaller than a distance between each adjacent lens of the fixed-focus projection lens.

15. The fixed-focus projection lens of claim 2, wherein a radius of curvature of different segments on the at least one surface of the sixth lens is different.

16. The fixed-focus projection lens of claim 15, wherein the radius of curvature of the at least one surface of the sixth lens decreases gradually from where the optical axis passes through to a side of the sixth lens.

17. The fixed-focus projection lens of claim 2, wherein a refractive index of the fifth lens is greater than 1.7.

18. The fixed-focus projection lens of claim 1, wherein the doublet lens satisfies the following conditions:

$-2.02 \leq fc/f \leq -1.78$;

where f is a focal length of the fixed-focus projection lens, and fc is a focal length of the doublet lens.

19. The fixed-focus projection lens of claim 1, wherein a distance between the third lens and the fourth lens is smaller than a distance between each adjacent lens of the fixed-focus projection lens.

20. The fixed-focus projection lens of claim 1, wherein a radius of curvature of different segments on the at least one surface of the sixth lens is different.

21. The fixed-focus projection lens of claim 20, wherein the radius of curvature of the at least one surface of the sixth lens decreases gradually from where the optical axis passes through to a side of the sixth lens.

22. The fixed-focus projection lens of claim 1, wherein the fixed-focus projection lens satisfies the following condition:

$-1.74 \leq f1/f \leq -1.60$;

where f is a focal length of the fixed-focus projection lens, and f1 is a focal length of the first lens.

23. The fixed-focus projection lens of claim 1, wherein the fixed-focus projection lens satisfies the following condition:

$2.02 \leq f2/f \leq 2.17$;

where f is a focal length of the fixed-focus projection lens, and f2 is a focal length of the second lens.

24. The fixed-focus projection lens of claim 1, wherein the fixed-focus projection lens satisfies the following condition:

$-0.85 \leq f3/f \leq -0.80$;

where f is a focal length of the fixed-focus projection lens, and f3 is a focal length of the third lens.

25. The fixed-focus projection lens of claim 1, wherein the fixed-focus projection lens satisfies the following condition:

$1.66 \leq f4/f \leq 1.81$;

where f is a focal length of the fixed-focus projection lens, and f4 is a focal length of the fourth lens.

26. The fixed-focus projection lens of claim 1, wherein the fixed-focus projection lens satisfies the following condition:

$1.81 \leq f5/f \leq 1.89$;

where f is a focal length of the fixed-focus projection lens, and f5 is a focal length of the fifth lens.

27. The fixed-focus projection lens of claim 1, wherein the fixed-focus projection lens satisfies the following condition:

$3.33 \leq f6/f \leq 3.50$;

where f is a focal length of the fixed-focus projection lens, and f6 is a focal length of the sixth lens.

28. The fixed-focus projection lens of claim 1, wherein a refractive index of the second lens is greater than 1.8.

29. The fixed-focus projection lens of claim 28, wherein a refractive index of the fifth lens is greater than 1.7.

30. The fixed-focus projection lens of claim 1, further comprises an aperture provided between the second lens and the third lens.

* * * * *